No. 778,243.      Patented December 27, 1904.

UNITED STATES PATENT OFFICE.

FRITZ HOFMANN, OF ELBERFELD, GERMANY, ASSIGNOR TO FARBENFABRIKEN OF ELBERFELD CO., OF NEW YORK, N. Y., A CORPORATION OF NEW YORK.

PROCESS OF MAKING DIALKYL CARBINOLS.

SPECIFICATION forming part of Letters Patent No. 778,243, dated December 27, 1904.

Application filed May 21, 1904. Serial No. 209,122.

*To all whom it may concern:*

Be it known that I, FRITZ HOFMANN, doctor of philosophy, chemist, residing at Elberfeld, Germany, (assignor to the FARBENFABRIKEN OF ELBERFELD COMPANY, of New York,) have invented a new and useful Improvement in New Processes of Preparing Dialkyl Carbinols Derived from Cyclocitriliden Acetic Acid; and I hereby declare the following to be a clear and exact description of my invention.

My invention relates to the production of the dialkyl carbinols derived from cyclocitriliden acetic acid having the following general formula:

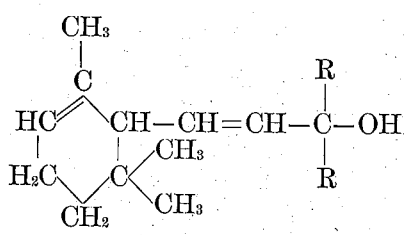

(R meaning alkyl radicals, such as methyl, ethyl, or the like.) According to my researches these bodies can be produced by first treating the known cyclocitriliden acetic acid of the formula

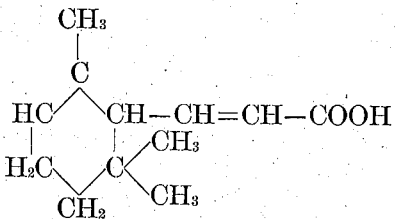

or its salts with the known additional products of halogen alkyl magnesium and an ether—*e. g.*, ethyl ether—having the following general formula:

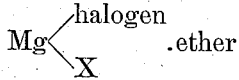

(X meaning an alkyl radical), and then decomposing with water or acids the resulting bodies produced by the interaction of these additional compounds with cyclocitriliden acetic acid or its salts. It is preferable to employ a surplus of the additional compounds of halogen alkyl magnesium and an ether.

In carrying out my process practically I can proceed as follows, the parts being by weight: Into a vessel provided with a reflux condenser, a stirrer, and a dropping-funnel and containing twenty-four parts of magnesium filings a mixture of ninety-five parts of methyl bromid and three hundred parts of ether (free from water) is dropped while cooling. A reaction sets in and the magnesium dissolves, the production of the additional compound having the formula

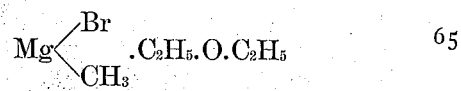

being the result. To the solution thus obtained sixty-four parts of cyclocitriliden acetic acid are slowly added while cooling and stirring. During the reaction methane escapes. After twenty-four hours a whitish-yellow precipitate is obtained, which is then decomposed by the addition of ice-water while stirring. The ethereal solution is separated from the water and shaken with a solution of sodium carbonate in order to remove small quantities of unchanged cyclocitriliden acetic acid. The ethereal solution of the body thus obtained is then distilled in a current of steam. The oil entrained with the steam dissolves in the ether at first distilled over. The resulting ethereal solution is separated from the water, dried over anhydrous sulfate of sodium, the ether is driven off, and the residue is distilled *in vacuo*. The known dimethyl carbinol derived from cyclocitriliden acetic acid thus obtained having the formula

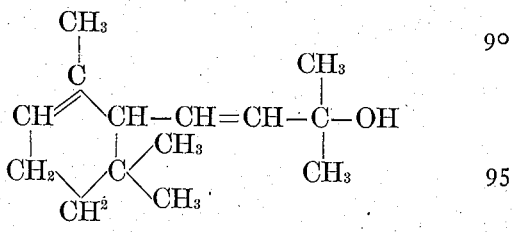

passes over at 130° centigrade under twenty millimeters pressure. It is a limpid oil having a smell of violets. On using the additional product obtained from ethyl bromid or iodid and ether the corresponding diethyl carbinol results.

Having now described my invention and in what manner the same is to be performed, what I claim as new, and desire to secure by Letters Patent, is—

1. The new process for producing the dialkyl carbinols derived from cyclocitriliden acetic acid having the above-given general formula, which process consists in first treating cyclocitriliden acetic acid with the additional products of halogen alkyl magnesium and an ether having the above-given general formula, and then decomposing the resulting compounds, substantially as hereinbefore described.

2. The new process for producing the dialkyl carbinols derived from cyclocitriliden acetic acid having the above-given general formula, which process consists in first treating salts of cyclocitriliden acetic acid with the additional products of halogen alkyl magnesium and an ether having the above-given general formula, and then decomposing the resulting compounds, substantially as hereinbefore described.

3. The new process for producing the dimethyl carbinol derived from cyclocitriliden acetic acid having the above-given formula, which process consists in first treating cyclocitriliden acetic acid with the additional compound of magnesium methyl bromid and ether having the above-given formula, and then decomposing the resulting compound, substantially as hereinbefore described.

In testimony whereof I have signed my name in the presence of two subscribing witnesses.

FRITZ HOFMANN.

Witnesses:
  OTTO KÖNIG,
  J. A. RITTERSHAUS.